(12) United States Patent
Richards et al.

(10) Patent No.: US 6,781,679 B1
(45) Date of Patent: Aug. 24, 2004

(54) IDENTIFYING A POLARIZATION-MODE DISPERSION EVENT

(75) Inventors: Douglas Lew Richards, Stilwell, KS (US); Christopher Thomas Allen, Independence, MO (US); Douglas C. Hague, Shawnee Mission, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 10/299,675

(22) Filed: Nov. 19, 2002

(51) Int. Cl.[7] .............................................. G01N 21/00
(52) U.S. Cl. ................................................... 356/73.1
(58) Field of Search ................ 356/73.1; 398/141–159; 385/24, 12, 3, 37, 40; 250/225

(56) References Cited

U.S. PATENT DOCUMENTS

| | | | |
|---|---|---|---|
| 5,227,623 A | * | 7/1993 | Heffner ..................... 250/225 |
| 6,396,606 B1 | | 5/2002 | Mao |
| 6,437,892 B1 | | 8/2002 | Fang et al. |
| 6,674,936 B2 | * | 1/2004 | Jacobowitz et al. .......... 385/24 |
| 2003/0002112 A1 | * | 1/2003 | Hirano et al. ............... 359/161 |

OTHER PUBLICATIONS

U.S. patent application Ser. No. 09/558,448, filed Apr. 25, 2000.
Kaminow, Ivan P., Koch, Thomas L, "Optical Fiber Telecommunications IIIA," Academic Press, 1997, pp. 143–151.
Derickson, Dennis, "Fiber Optic Test and Measurement," Hewlett–Packard Company, 1998, Prentice Hall.
Agilent Technologies, "Narrowband PMD Measurements with the Agilent 8509C, Product Note 8509–2," 1999.
Namihira, Y. and Maeda, J., "Comparison of Various Polarisation Mode Duspersion Measurement Methods in Optical Fibres," Electronics Letters, Dec. 3rd,1992, vol. 28 No. 25, pp. 2265–2266.
Allen, Christoper, Kondamuri, Pradeep Kumar, Richards, Douglas, Hague, Douglas, "Measured Temporal and Spectral PMD characteristics and Their Implications for Network–Level Mitigation approaches," Journal of Lightwave Technology, Apr. 11, 2002.
Allen, Christopher, Kondamuri, Pradeep Kumar, Richards, Douglas, and Hague, Douglas, "Analysis and Comparison of Measured DGD Data on Buried single–Mode Fibers," Symposium on Optical Fibert Measurements, Jun. 7, 2002.
Karlsson, Magnus, Brentel, Jonas, Autocorrelation Function of the Polarization–Mode Dispersion Vector, Optics Letters, Jul. 15, 1999, vol. 24, No. 14, pp. 939–941.

* cited by examiner

Primary Examiner—Tu T. Nguyen

(57) ABSTRACT

A system identifies a polarization-mode dispersion (PMD) event in an optical fiber by determining error conditions in proximate wavelengths. The system includes an optical interface and a PMD identification system. The optical interface receives an optical signal from the optical fiber wherein the optical signal is wavelength division multiplexed with a plurality of wavelengths. The PMD identification system determines whether a first error condition exists in a first one of the wavelengths of the optical signal. The PMD identification system also determines whether a second error condition exists in a second one of the wavelengths of the optical signal wherein the second one of the wavelengths is proximate to the first one of the wavelengths. The PMD identification system also determines whether an acceptable condition exists in a third one of the wavelengths of the optical signal that is not proximate to the first one and the second one of the wavelengths of the optical signal. The PMD identification system then determines the presence of the polarization-mode dispersion event in the optical fiber based on the first error condition, the second error condition, and the acceptable condition.

32 Claims, 5 Drawing Sheets

| DGD Margin | Outage Probability | Mean Outage Rate | Mean Outage Duration |
|---|---|---|---|
| M | Pout | Rout | Tout |
| Threshold/<DGD> | (min/year) | (events/year) | (min/event) |
| 1.0 | 243046 | 461 | 527.0 |
| 1.1 | 197138 | 427 | 461.6 |
| 1.2 | 155591 | 379 | 410.3 |
| 1.3 | 119480 | 324 | 369.1 |
| 1.4 | 89268 | 266 | 335.3 |
| 1.5 | 64893 | 211 | 307.2 |
| 1.6 | 45901 | 162 | 283.4 |
| 1.7 | 31594 | 120 | 263.0 |
| 1.8 | 21162 | 86.2 | 245.4 |
| 1.9 | 13796 | 60.0 | 229.9 |
| 2.0 | 8754 | 40.5 | 216.4 |
| 2.1 | 5407 | 26.5 | 204.3 |
| 2.2 | 3251 | 16.8 | 193.5 |
| 2.3 | 1903 | 10.4 | 183.8 |
| 2.4 | 1084 | 6.20 | 175.0 |
| 2.5 | 602 | 3.60 | 167.0 |
| 2.6 | 325 | 2.04 | 159.7 |
| 2.7 | 171 | 1.12 | 153.1 |
| 2.8 | 87.7 | 0.597 | 146.9 |
| 2.9 | 43.8 | 0.310 | 141.2 |
| 3.0 | 21.3 | 0.156 | 136.0 |
| 3.1 | 10.1 | 0.0768 | 131.1 |
| 3.2 | 4.65 | 0.0367 | 126.5 |
| 3.3 | 2.09 | 0.0171 | 122.3 |
| 3.4 | 0.913 | 0.00772 | 118.3 |
| 3.5 | 0.389 | 0.00340 | 114.6 |
| 3.6 | 0.162 | 0.00146 | 111.1 |
| 3.7 | 0.0654 | 6.07E-04 | 107.8 |
| 3.8 | 0.0258 | 2.46E-04 | 104.6 |
| 3.9 | 0.00990 | 9.74E-05 | 101.7 |
| 4.0 | 0.00370 | 3.75E-05 | 98.9 |
| 4.1 | 0.00135 | 1.40E-05 | 96.3 |
| 4.2 | 4.80E-04 | 5.12E-06 | 93.7 |
| 4.3 | 1.66E-04 | 1.82E-06 | 91.4 |
| 4.4 | 5.60E-05 | 6.29E-07 | 89.1 |
| 4.5 | 1.84E-05 | 2.12E-07 | 86.9 |
| 4.6 | 5.89E-06 | 6.94E-08 | 84.9 |
| 4.7 | 1.84E-06 | 2.22E-08 | 82.9 |
| 4.8 | 5.59E-07 | 6.90E-09 | 81.0 |
| 4.9 | 1.66E-07 | 2.09E-09 | 79.3 |
| 5.0 | 4.82E-08 | 6.18E-10 | 78.0 |

FIG. 5

IDENTIFYING A POLARIZATION-MODE DISPERSION EVENT

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to systems and methods that identify a polarization-mode dispersion event.

2. Description of the Prior Art

Polarization-mode dispersion (PMD) is a dynamic pulse broadening phenomena. In a single-mode optical fiber, it is understood that optical pulses propagating down an optical fiber will separate into two orthogonal modes of polarization that travel at different speeds. The relative amplitudes of these two pulses is determined by the state of polarization of the input pulse relative to the fiber's input principal states of polarization (PSP). The separation into the two orthogonal modes is caused by the non-uniformity of the core diameter. This non-uniformity of the core diameter may be a result of imperfections in manufacturing, ambient temperatures, stress on the optical fiber, and/or movement of the optical fiber.

If the core has a perfectly circular cross-section, then both modes will travel at the same speed over the same distance. Otherwise, one mode will travel slower than the other resulting in a difference in group velocities (an effect called birefringence). Like chromatic dispersion, the difference in velocities between polarization modes is wavelength dependent. For PMD, the difference in velocity is also time dependent. The difference in propagation time, $\Delta\tau$, experienced by the two polarization modes at a given wavelength is referred to as the differential group delay (DGD) with units in picoseconds (ps). It is well known that $\Delta\tau$ obeys a Maxwellian distribution. When the DGD in an optical fiber becomes excessively large, the receiver is unable to distinguish between a zero bit and a one bit, and bit errors occur eventually resulting in a PMD-induced outage.

PMD is a time varying stochastic effect. Identification, measurement, and compensation for PMD is difficult because of the time varying stochastic nature of PMD. A fiber operator may have an outage on their fiber that is unknowingly caused by PMD. Due to the time varying stochastic nature of PMD, the outage may resolve itself Thus, the fiber operator may have trouble tickets that are closed or left unresolved even after extensive activity by maintenance employees. The only way of identifying PMD has been through direct measurement of PMD or other analog characteristics of the optical signal. Some prior systems have identified, measured, and compensated for PMD by measurement of DGD and PSP. One such system is disclosed in a pending United States Patent Application, entitled "Method And Apparatus To Compensate For Polarization Mode Dispersion," filed on Feb. 8, 2000, Ser. No. 09/500,092. Other prior systems monitor eye openings of the optical signal or perform other analog measurements of the optical signal to identify PMD. Another prior system measures the PMD, measures a bit error rate (BER), and correlates the PMD and BER to isolate errors due to the PMD. This system is disclosed in a pending United States Patent Application, entitled "Correlating Polarization Mode Dispersion and Bit Error Rate," filed on Apr. 25, 2000, Ser. No. 09/558,448. One problem with these prior systems is the cost of identifying, measuring, and compensating for PMD can be expensive. What is needed is a system to identify PMD that is accurate and cost effective.

SUMMARY OF THE INVENTION

The inventions solve the above problems by identifying a polarization-mode dispersion event in an optical fiber by determining error conditions in proximate wavelengths. The embodiments of the invention identifies these PMD events without measurement of PMD, DGD, or any other analog characteristic of the signal. A system includes an optical interface and a PMD identification system. The optical interface receives an optical signal from the optical fiber wherein the optical signal is wavelength division multiplexed with a plurality of wavelengths. The PMD identification system determines whether a first error condition exists in a first one of the wavelengths of the optical signal. The PMD identification system also determines whether a second error condition exists in a second one of the wavelengths of the optical signal wherein the second one of the wavelengths is proximate to the first one of the wavelengths. The PMD identification system also determines whether an acceptable condition exists in a third one of the wavelengths of the optical signal that is not proximate to the first one and the second one of the wavelengths of the optical signal. The PMD identification system then determines the presence of the polarization-mode dispersion event in the optical fiber based on the first error condition, the second error condition, and the acceptable condition.

In some embodiments, the first error condition is an error count in the first one of the wavelengths of the optical signal. In other embodiments, the first error condition is signal degradation in the first one of the wavelengths of the optical signal. In some embodiments, the second error condition is an error count in the second one of the wavelengths of the optical signal. In other embodiments, the second error condition is signal degradation in the second one of the wavelengths of the optical signal. In some embodiments, the acceptable condition is an acceptable error count in the third one of the wavelengths of the optical signal. In some embodiments, the acceptable condition is an acceptable signal condition in the third one of the wavelengths of the optical signal. In one embodiment, the processing system determines the probability of the polarization-mode dispersion event in the optical fiber based on a first differential group delay of a receiver system and a mean differential group delay of the optical fiber to improve the confidence of the identification. In some embodiments, the system includes a forward error correction decoder to decode the optical signal with forward error correction. In some embodiments, the system includes a demultiplexer to demultiplex the optical signal with the plurality of wavelengths.

Because PMD has an effect on proximate wavelengths in an optical signal, the system advantageously identifies PMD events by determining error conditions in proximate wavelengths. A high PMD event is localized within a small band of wavelengths. The width of this band is termed the DGD bandwidth. Thus, a PMD event is identified without actually measuring the instantaneous PMD or monitoring the analog characteristics of the optical signal for PMD. As a result, the overall costs of identifying PMD and maintaining a fiber network are reduced.

BRIEF DESCRIPTION OF THE DRAWINGS

The same reference number represents the same element on all drawings.

FIG. 5 is a table of polarization-mode dispersion statistics in an example of the invention.

DETAILED DESCRIPTION OF THE INVENTION

FIGS. 1–5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
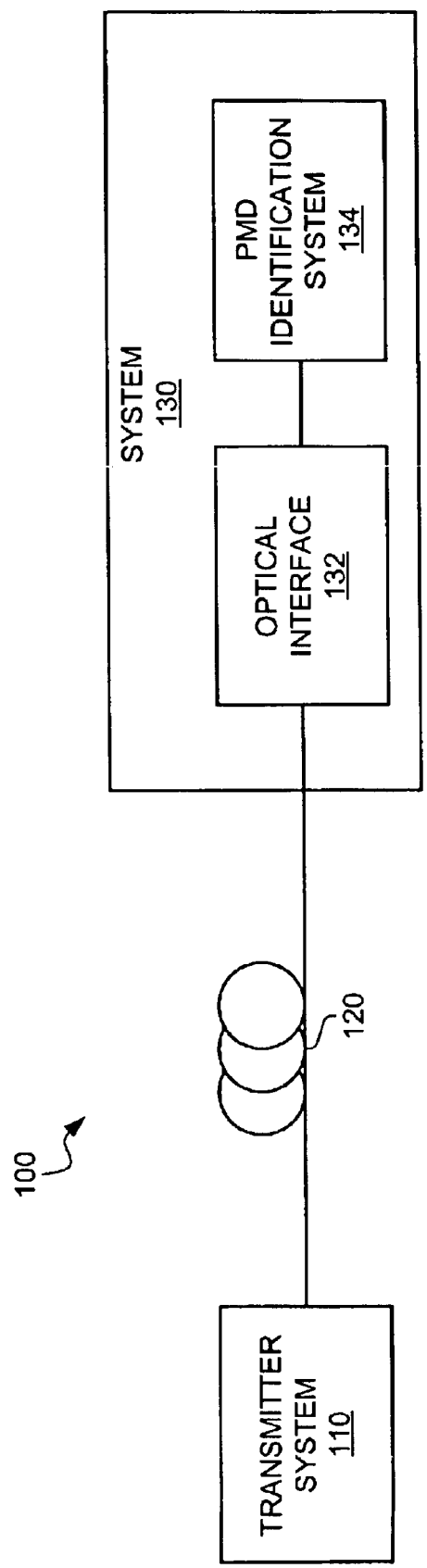
FIG. 1 is an illustration of a communication network in an example of the invention.
Figure 2:
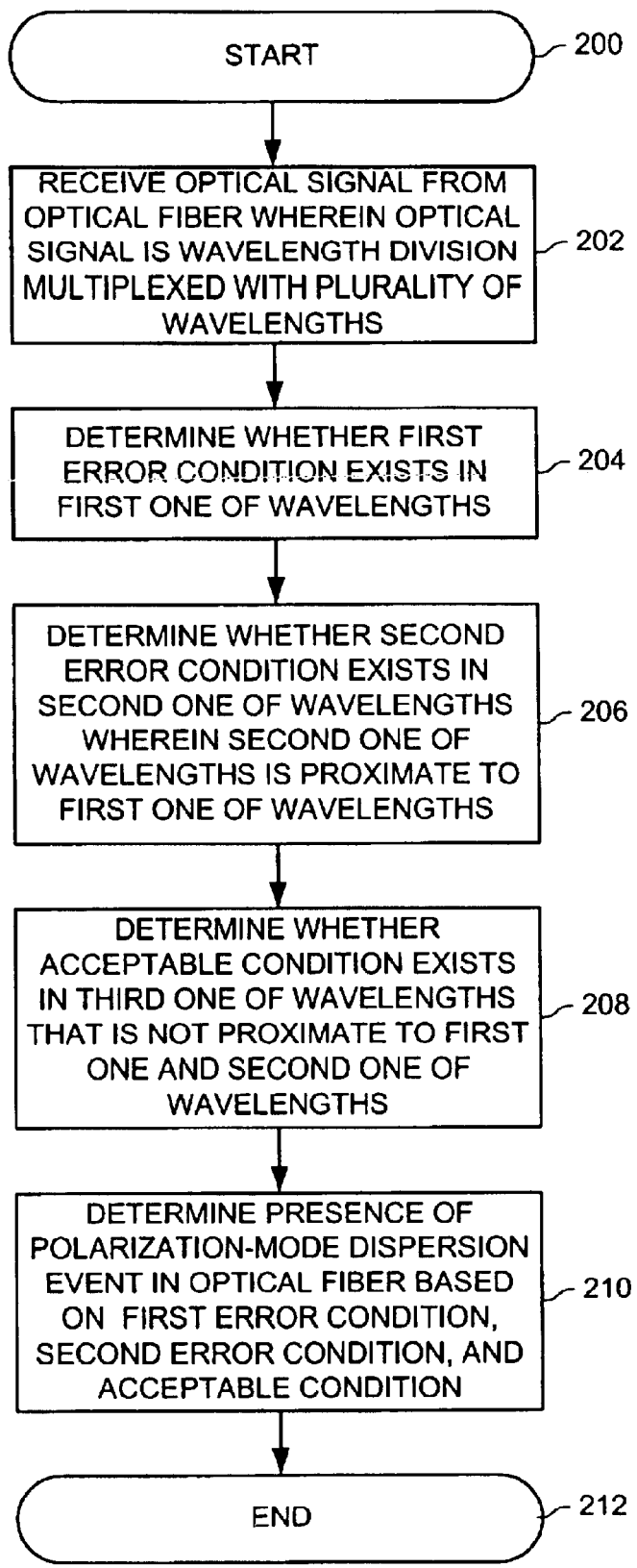
FIG. 2 is a flow chart for a system in an example of the invention.

Identifying Polarization-Mode Dispersion Events—FIGS. 1–2

FIG. 1 depicts an illustration of a communication network 100 in an example of the invention. The communication network 100 includes a transmitter system 110, an optical fiber 120, and a system 130. The system 130 includes an optical interface 132 and a polarization-mode dispersion (PMD) identification system 134. The transmitter system 110 is connected to the optical interface 132 via the optical fiber 120. The optical interface 132 is connected to the PMD identification system 134.

The transmitter system 110 is any conventional device, group of devices, or system configured to transmit optical signals. The optical fiber 120 is any conventional optical fiber that carries optical signals. The optical interface 132 is any device, group of devices, or system configured to receive an optical signal from the optical fiber 120 wherein the optical signal is wavelength division multiplexed with a plurality of wavelengths. Some examples of the optical interface 132 include wavelength division multiplexing (WDM) demultiplexers and photodiodes. In some embodiments, the optical signal is dense wavelength division multiplexed.

The PMD identification system 134 is any device, group of devices, or system configured to (1) determine whether a first error condition exists in a first one of the wavelengths of the optical signal, (2) determine whether a second error condition exists in a second one of the wavelengths of the optical signal wherein the second one of the wavelengths is proximate to the first one of the wavelengths, (3) determine whether an acceptable condition exists in a third one of the wavelengths of the optical signal that is not proximate to the first one and the second one of the wavelengths of the optical signal, and (4) determine the presence of the polarization-mode dispersion event in the optical fiber based on the first error condition, the second error condition, and the acceptable condition.

A polarization-mode dispersion event is any situation, outage, or potential outage that indicates the presence of polarization-mode dispersion. An error condition is any condition or situation that indicates an error, problem or degradation of an optical signal in an optical fiber. Some examples of error conditions are high bit error counts or optical signal degradation. An acceptable condition is any condition or situation that indicates satisfactory or normal operations of an optical signal in an optical fiber. Some examples of acceptable conditions are low error counts or acceptable signal conditions. A wavelength is proximate to another wavelength when the two wavelengths are next to, adjacent, or near each other. For example, adjacent wavelengths are separated by 0.4 nm and 0.2 nm for a 50 GHz and 25 GHz channel plan within the C band, respectively. In one embodiment, a wavelength is proximate to another wavelength if the two wavelengths are within the DGD bandwidth (i.e., the absolute value of $[\lambda_1-\lambda_2]<=c/\omega_c$) where $\lambda_1$ and $\lambda_2$ are the wavelengths of the first and second wavelengths, c is the speed of light in the medium, and $\omega_c$ is the DGD bandwidth in Hertz. The DGD bandwidth is inversely proportional to the mean DGD, $<\Delta\tau>$, as shown in the following equation:

$$\omega_c = \frac{4\sqrt{2}}{\langle\Delta\tau\rangle}$$

In operation, the transmitter system 110 transmits an optical signal via the optical fiber 120. In some embodiments, the transmitter system 110 scrambles the polarization of the optical signal to avoid launching on a principal state of polarization and partially obscuring the measurement technique. In some of these embodiments, a scrambler within the transmitter system 110 scrambles the polarizations of the optical signal.

FIG. 2 depicts a flow chart for the system 130 in an example of the invention. FIG. 2 begins in step 200. In step 202, the optical interface 132 receives an optical signal from the optical fiber 120 wherein the optical signal is wavelength division multiplexed with a plurality of wavelengths. In step 204, the PMD identification system 134 determines whether a first error condition exists in a first one of the wavelengths of the optical signal. In step 206, the PMD identification system 134 determines whether a second error condition exists in a second one of the wavelengths of the optical signal wherein the second one of the wavelengths is proximate to the first one of the wavelengths. In step 208, the PMD identification system 134 determines whether an acceptable condition exists in a third one of the wavelengths of the optical signal that is not proximate to the first one and the second one of the wavelengths of the optical signal. In step 210, the PMD identification system 134 determines the presence of the polarization-mode dispersion event in the optical fiber 120 based on the first error condition, the second error condition, and the acceptable condition. FIG. 2 ends in step 212.

Because PMD has an effect on proximate wavelengths in an optical signal, which is discussed in further detail below, the system 130 advantageously identifies PMD events by determining error conditions in proximate wavelengths. Thus, a PMD event is identified without actually measuring the instantaneous PMD or monitoring the analog characteristics of the optical signal for PMD. As a result, the overall costs of identifying PMD and operating and maintaining a fiber network are reduced.

Figure 3:
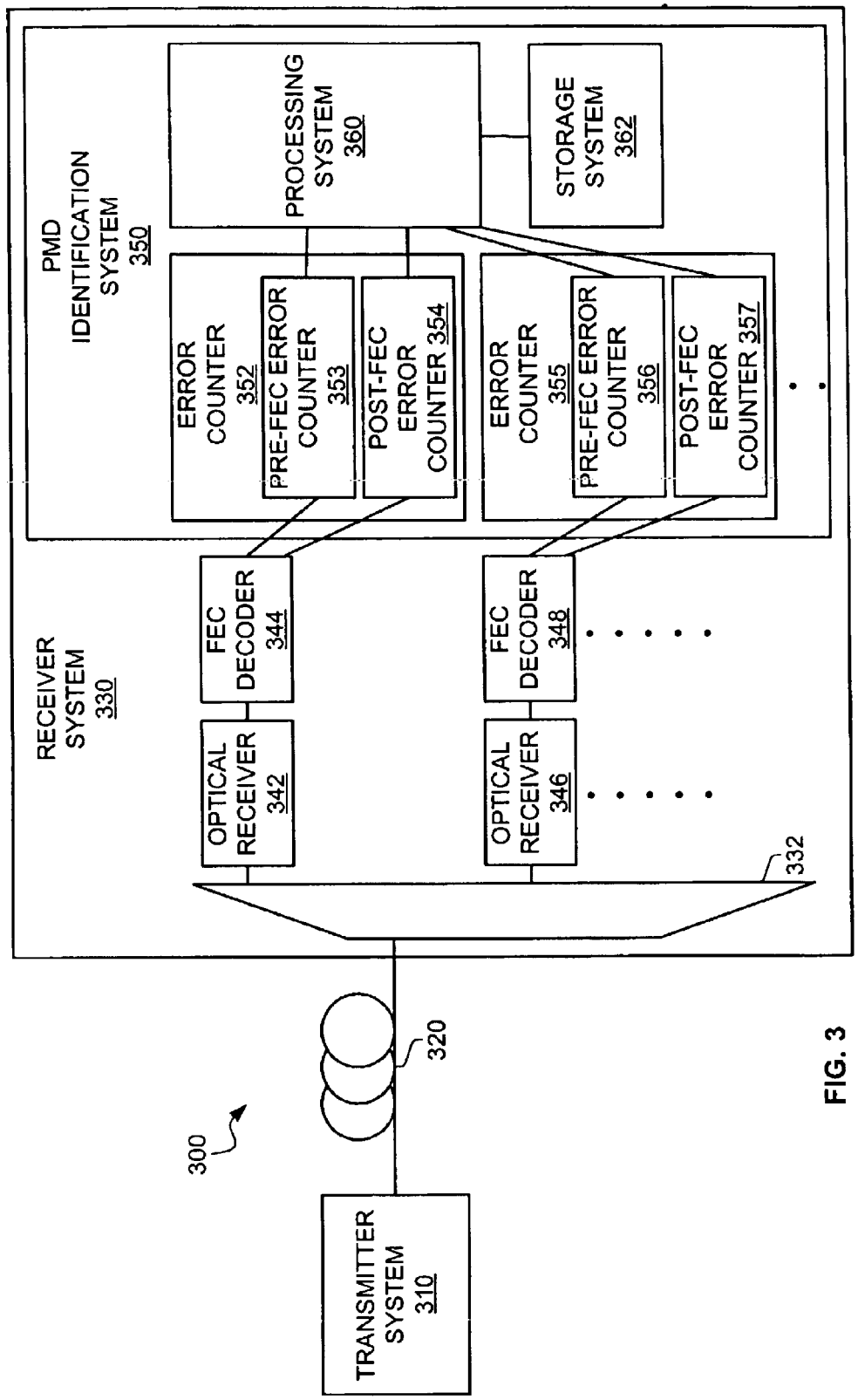
FIG. 3 is an illustration of a communication network with forward error correction, pre-FEC error counting and post-FEC error counting in an example of the invention.
Figure 4:
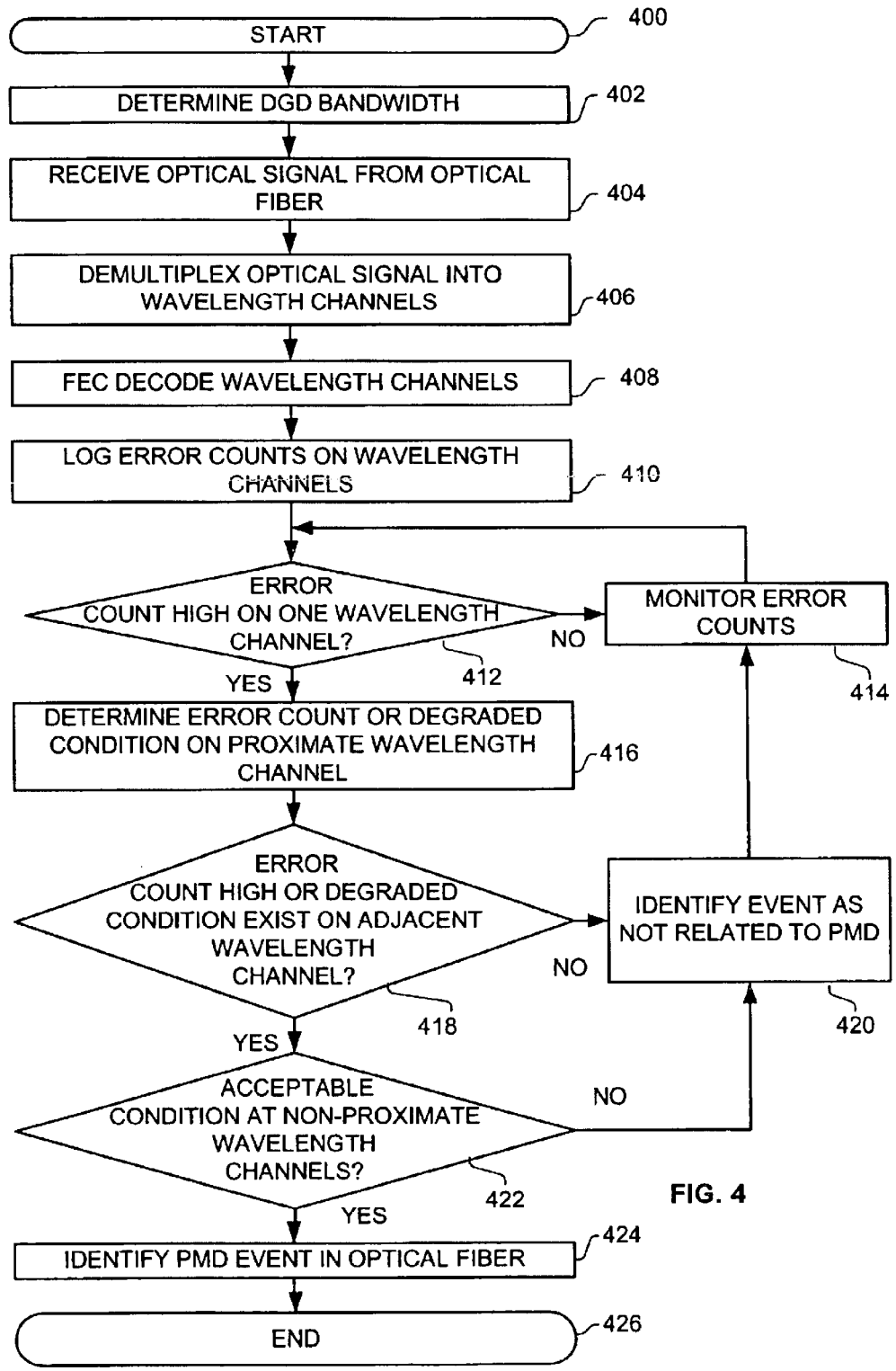
FIG. 4 is a flow chart for a receiver system with forward error correction and bit error counting in an example of the invention.

Identifying Polarization—Mode Dispersion Events with Forward Error Correction and Error Counting—FIGS. 3–5

FIG. 3 depicts an illustration of a communication network 300 with forward error correction and bit error counting in an example of the invention. The communication network 300 includes a transmitter system 310, an optical fiber 320, and a receiver system 330. The receiver system 330 includes a dense wavelength division multiplexing (DWDM) demultiplexer 332, an optical receiver 342, a forward error correction (FEC) decoder 344, an optical receiver 346, an FEC decoder 348, and a PMD identification system 350. The PMD identification system 350 includes an error counter 352, an error counter 355, a processing system 360, and a storage system 362. The error counter 352 comprises a pre-FEC error counter 353 and a post-FEC error counter 354. The error counter 355 comprises a pre-FEC error counter 356 and a post-FEC error counter 357.

The transmitter system 310 is connected to the DWDM demultiplexer 332 via the optical fiber 320. The DWDM demultiplexer 332 is connected to the optical receiver 342 and the optical receiver 346. The optical receiver 342 is connected to the FEC decoder 344. The FEC decoder 344 is connected to the pre-FEC error counter 353 and the post-FEC error counter 354. The pre-FEC error counter 353 and the post-FEC error counter 354 are connected to the processing system 360. The optical receiver 346 is connected to the FEC decoder 348. The FEC decoder 348 is connected to the pre-FEC error counter 356 and the post-FEC error counter 357. The pre-FEC error counter 356 and the post-FEC error counter 357 are connected to the processing system 360.

The DWDM demultiplexer 332 has outputs for the wavelength channels, which are connected to the optical receivers 342 and 346. The optical receiver 342, the FEC decoder 344, and the error counter 352 correlate to the first wavelength channel, while the optical receiver 346, the FEC decoder 348, and the error counter 354 correlate to the second wavelength channel. The other outputs of the DWDM demultiplexer 332 and the corresponding optical receiver, FEC decoder, and error counter for the other remaining wavelength channels are not shown in FIG. 3 for the sake of simplicity.

In operation, the transmitter system 310 transmits an optical signal via the optical fiber 320 wherein the optical signal is FEC encoded and dense wavelength division multiplexed. FIG. 4 depicts a flow chart for a receiver system 330 with forward error correction, pre-FEC error counting and post-FEC error counting in an example of the invention. FIG. 4 begins in step 400. In step 402, the processing system 360 determines DGD bandwidth.

In step 404, the DWDM demultiplexer 332 receives the optical signal from the optical fiber 320. In step 406, the DWDM demultiplexer 332 demultiplexes the optical signal into wavelength channels. The optical receiver 342 then receives the optical signal for one of the wavelength channels and converts the optical signal into an electrical signal. One example of the optical receiver 342 is a photodector. In step 408, the FEC decoder 344 then FEC decodes the electrical signal. In step 410, the FEC decoder 344 logs the number of bit errors corrected with the pre-FEC error counter 353. If the FEC decoder 344 is unable to correct the electrical signal, then the FED decoder 344 logs an error in the post-FEC counter 354. In this embodiment, FEC correction occurs prior to PMD event identification. In some embodiments, PMD identification occurs with no FEC correction. In another embodiment, unusually high pre-FEC errors are proactively monitored on all channels to either predict or proactively protect the channels so there is no unscheduled event. In this proactive case, an unusually high pre-FEC errors identified in step 412 starts or triggers the investigation in step 416.

In step 412, the processing system 360 determines whether an error count is high on one of the wavelength channels. If the error count is not high, the processing system 360 monitors the error counts for the other wavelength channels in step 414 before returning to step 412. The processing system 360 is waiting for a triggering event in step 412 and step 414. If a triggering count is not present, the processing system 360 continues to assist in logging of errors and waits for a triggering event. Once the processing system 360 determines a triggering event has occurred through a high error count or a degraded condition in step 412, the processing system 360 determines the error counts or degraded conditions on a proximate wavelength channel in step 416. In this embodiment, the error count for the proximate wavelength channel is from the pre-FEC error counter 356.

In step 418, the processing system 360 then checks whether the error count for any proximate wavelength channel is high or a degraded condition exists for the proximate wavelength channel. If the error count for any proximate wavelength channel is not high and there is no degraded condition for any proximate wavelength channel, the processing system 360 identifies the event as not related to PMD in step 420 and the process returns to step 414. If the error count for a proximate wavelength channel is high or there is degraded condition in the proximate wavelength channel, then the processing system 360 determines if at least one non-proximate wavelength channel is operating with acceptable conditions in step 422. If at least one non-proximate wavelength channel is operating with acceptable conditions, the processing system 360 identifies that the error condition on the first one of the wavelengths is occurring due to a polarization-mode dispersion event on the optical fiber 320 in step 424. This identification as a PMD induced error condition is based on the occurrence of a high error count on the wavelength channel, the presence of a high error count or degraded condition on the proximate wavelength channel, and acceptable conditions in at least one non-proximate wavelength channel in step 424. FIG. 4 ends in step 426.

In other embodiments, the processing system 360 performs the operations of the FEC decoder 344 and the error counter 352. In some embodiments, the processing system 360 generates and transmits an instruction indicating the presence of PMD to other management systems or systems that need to be alerted for PMD.

In another embodiment, the processing system 360 uses a table as depicted in FIG. 5 to determine the likelihood of PMD events and may be used to enhance the confidence of the PMD event identification in step 424. FIG. 5 depicts a table of polarization-mode dispersion statistics in an example of the invention. The table in FIG. 5 assists engineers and network planners in gauging the impact of PMD on link availability and is based on a study of a direct-buried fiber-optic cable and a calculated measure, M. The data in FIG. 5 can be used to estimate PMD induced outage probability of non-proximate wavelengths and therefore, the expected number of non-proximate wavelengths that should be operating with acceptable conditions. Observation that the expected number of wavelengths is operating with acceptable conditions would improve the confidence of the outage as a PMD induced outage.

In FIG. 5, the first column, M, is a ratio of a receiver's DGD tolerance, $\Delta\tau_{RX}$, to the optical fiber's mean DGD $<\Delta\tau>$. The second column, $P_{out}$, is an annualized outage probability in minutes/year. The third column, $R_{out}$, is a mean outage rate with a number of outage events/year. The fourth column, $T_{out}$, is a mean outage duration in minutes/event. Thus, optical fibers with a high mean DGD have a narrower DGD bandwidth than optical fibers with a low mean DGD. While PMD-induced events are localized in frequency (i.e., occurring at a narrow band of wavelengths), in a DWDM system where channel spacing is small, a PMD-induced outage may affect a handful of proximate wavelength channels. In a DWDM application, if a PMD event arises on one channel as registered by the occurrence of bit errors, it is likely that proximate wavelength channels are affected to some extent. No other fiber impairment or trouble resulting from a hardware failure is known to be so spectrally localized and be sustained for the time durations shown in FIG. 5. (While a laser's drifting wavelength could also cause spectrally localized problems, laser operating wavelengths are continuously monitored and when excessive drift is detected, the wayward lasers are automatically shutdown.)

The following three examples show how the table in FIG. 5 is used. The first example is for a 10-Gb/s optical system with a mean DGD of 10 ps and a receiver's DGD tolerance of 40 ps. The DGD margin, M, for this first example is 4. The outage probability is about $7.4\times10^{-9}$ or effectively zero based on the 0.0037 minutes/year from FIG. 5 for a DGD margin of 4. Thus, a PMD-induced event is unlikely to be occurring on non-proximate wavelengths. For this case, the DGD bandwidth will be about 90 GHz or about 0.72 nm. When a PMD-induced event does occur, it is highly likely that higher than normal errors will be present on proximate wavelength channels in a system with 50 GHz (0.4 nm) channel spacing, and highly likely that all non-proximate wavelengths will be operating under acceptable conditions.

The second example is for a 10-Gb/s optical system with a mean DGD of 10 ps and a receiver's DGD tolerance of 23 ps. The DGD margin, M, for this second example is 2.3. The outage probability of the DGD exceeding the receiver's limit is about 0.37%. Based on the buried optical fiber for the table in FIG. 5, PMD-induced events will typically occur about once a month with a mean duration of about three hours. The DGD bandwidth will be about 90 GHz and it is highly likely that higher than normal bit errors will be present on proximate wavelength channels. In this example, if the system has many wavelengths, a small number of non-proximate wavelengths may also be experiencing errors or a degraded condition. It is highly likely that most non-proximate wavelengths will be operating with acceptable conditions.

The third example is for a 40-Gb/s optical system with a mean DGD of 3.2 ps and a receiver's DGD tolerance of 5.7 ps. The DGD margin, M, for this third example is 1.8. The outage probability of the DGD exceeding the receiver's limit is about 4.4%. The PMD-induced outage typically will occur about every six days with a mean duration of about 4 hours. However, outages persisting for a day may occur. The DGD bandwidth is about 2.2 nm or 280 GHz, so several proximate channels with a 50 GHz spacing will have high BERs. Also, for a DWDM application with 100 GHz channel spacing, proximate wavelength channels would also be affected during each event. It is also likely that for any DWDM system that has a significant number of wavelengths, a small number of group of non-proximate wavelengths would be experiencing PMD induced outages.

The processing system 360 could be comprised of a programmed general-purpose computer, although those skilled in the art will appreciate that programmable or special purpose circuitry and equipment may be used. The processing system 360 could comprise a computer microprocessor, logic circuit, or some other processing device. The processing system 360 may be distributed among multiple processing devices. The storage system 362 could comprise a disk, tape, integrated circuit, server, or some other memory device. The storage system 362 may be distributed among multiple memory devices.

The processing system 360 retrieves and executes operating software and application software from the storage system 362. The operating software may comprise an operating system, utilities, drivers, networking software, and other software typically loaded onto a general-purpose computer. The application software could comprise an application program, firmware, or some other form of machine-readable processing instructions. When executed by the processing system 360, application software directs the processing system 360 to operate in accord with the invention as described above.

What is claimed is:

1. A method of identifying a polarization-mode dispersion event in an optical fiber, the method comprising:

receiving an optical signal from the optical fiber wherein the optical signal is wavelength division multiplexed with a plurality of wavelengths;

determining whether a first error condition exists in a first one of the wavelengths of the optical signal;

determining whether a second error condition exists in a second one of the wavelengths of the optical signal wherein the second one of the wavelengths is proximate to the first one of the wavelengths;

determining whether an acceptable condition exists in a third one of the wavelengths of the optical signal that is not proximate to the first one and the second one of the wavelengths of the optical signal; and determining the presence of the polarization-mode dispersion event in the optical fiber based on the first error condition, the second error condition, and the acceptable condition.

2. The method of claim 1 wherein the first error condition comprises an error count in the first one of the wavelengths of the optical signal.

3. The method of claim 1 wherein the first error condition comprises signal degradation in the first one of the wavelengths of the optical signal.

4. The method of claim 1 wherein the second error condition comprises an error count in the second one of the wavelengths of the optical signal.

5. The method of claim 1 wherein the second error condition comprises signal degradation in the second one of the wavelengths of the optical signal.

6. The method of claim 1 wherein the acceptable condition comprises an acceptable error count in the third one of the wavelengths of the optical signal.

7. The method of claim 1 wherein the acceptable condition comprises an acceptable signal condition in the third one of the wavelengths of the optical signal.

8. The method of claim 1 wherein determining the presence of the polarization-mode dispersion event in the optical fiber further comprises determining the probability of the polarization-mode dispersion event in the optical fiber based on a first differential group delay tolerance of a receiver system and a mean differential group delay of the optical fiber.

9. The method of claim 1 further comprising decoding the optical signal with forward error correction.

10. The method of claim 1 further comprising demultiplexing the optical signal with the plurality of wavelengths.

11. The method of claim 1 further comprising transmitting the optical signal over the optical fiber.

12. The method of claim 11 further comprising scrambling polarizations of the optical signal.

13. A system for identifying a polarization-mode dispersion (PMD) event in an optical fiber, the system comprising:

an optical interface configured to receive an optical signal from the optical fiber wherein the optical signal is wavelength division multiplexed with a plurality of wavelengths; and a PMD identification system configured to determine whether a first error condition exists in a first one of the wavelengths of the optical signal, determine whether a second error condition exists in a second one of the wavelengths of the optical signal wherein the second one of the wavelengths is proximate to the first one of the wavelengths, determine whether an acceptable condition exists in a third one of the wavelengths of the optical signal that is not proximate to the first one and the second one of the wavelengths of the optical signal, and determine the presence of die polarization-mode dispersion event in the optical fiber based on the first error condition, the second error condition, and the acceptable condition.

14. The system of claim 13 wherein the first error condition comprises an error count in the first one of the wavelengths of the optical signal.

15. The system of claim 13 wherein the first error condition comprises signal degradation in the first one of the wavelengths of the optical signal.

16. The system of claim 13 wherein the second error condition comprises an error count in the second one of the wavelengths of the optical signal.

17. The system of claim 13 wherein the second error condition comprises signal degradation in the second one of the wavelengths of the optical signal.

18. The system of claim 13 wherein the acceptable condition comprises an acceptable error count in the third one of the wavelengths of the optical signal.

19. The system of claim 13 wherein the acceptable condition comprises an acceptable signal condition in the third one of the wavelengths of the optical signal.

20. The system of claim 13 wherein the PMD identification system is configured to determine the probability of the polarization-mode dispersion event in the optical fiber based on a first differential group delay tolerance of a receiver system and a mean differential group delay of the optical fiber.

21. The system of claim 13 further comprising a forward error correction decoder configured to decode the optical signal with forward error correction.

22. The system of claim 13 further comprising a demultiplexer configured to demultiplex the optical signal with the plurality of wavelengths.

23. The system of claim 13 further comprising a transmitter system configured to transmit the optical signal over the optical fiber.

24. The system of claim 23 further comprising a scrambler configured to scramble polarizations of the optical signal.

25. A software product for identifying a polarization-mode dispersion event in an optical fiber, wherein the optical fiber is configured to transport an optical signal that includes a plurality of wavelengths, the software product comprising:

application software operational when executed by a processor to direct the processor to determine whether a first error condition exists in a first one of the wavelengths of an optical signal from the optical fiber, determine whether a second error condition exists in a second one of the wavelengths of the optical signal wherein the second one of the wavelengths is proximate to the first one of the wavelengths, determine whether an acceptable condition exists in a third one of the wavelengths of the optical signal that is not proximate to the first one and the second one of the wavelengths of the optical signal, and determine the presence of the polarization-mode dispersion event in the optical fiber based on the first error condition, the second error condition, and the acceptable condition; and a software storage medium operational to store the application software.

26. The software product of claim 25 wherein the first error condition comprises an error count in the first one of the wavelengths of the optical signal.

27. The software product of claim 25 wherein the first error condition comprises signal degradation in the first one of the wavelengths of the optical signal.

28. The software product of claim 25 wherein the second error condition comprises an error count in the second one of the wavelengths of the optical signal.

29. The software product of claim 25 wherein the second error condition comprises signal degradation in the second one of the wavelengths of the optical signal.

30. The software product of claim 25 wherein the acceptable condition comprises an acceptable error count in the third one of the wavelengths of the optical signal.

31. The software product of claim 25 wherein the acceptable condition comprises an acceptable signal condition in the third one of the wavelengths of the optical signal.

32. The software product of claim 25 wherein the application software is operational when executed by the processor to direct the processor to determine the probability of the polarization-mode dispersion event in the optical fiber based on a first differential group delay tolerance of a receiver system and a mean differential group delay of the optical fiber.

* * * * *

UNITED STATES PATENT AND TRADEMARK OFFICE
CERTIFICATE OF CORRECTION

PATENT NO. : 6,781,679 B1
DATED : August 24, 2004
INVENTOR(S) : Douglas Lew Richards, Christopher Thomas Allen and Douglas C. Hague It is certified that error appears in the above-identified patent and that said Letters Patent is hereby corrected as shown below:

Title page,
Item [73], Assignee, should read:
-- Sprint Communications Company, L.P., Overland Park, KS (US);
University of Kansas, Lawrence, KS (US) --.

Signed and Sealed this

Fourteenth Day of February, 2006

JON W. DUDAS
*Director of the United States Patent and Trademark Office*